US007251680B2

(12) United States Patent
DeVos (10) Patent No.: US 7,251,680 B2
(45) Date of Patent: Jul. 31, 2007

(54) SINGLE INSTANCE BACKUP OF EMAIL MESSAGE ATTACHMENTS

(75) Inventor: Steven R. DeVos, Kirkland, WA (US)

(73) Assignee: Veritas Operating Corporation, Cupertino, CA (US)

( * ) Notice: Subject to any disclaimer, the term of this patent is extended or adjusted under 35 U.S.C. 154(b) by 546 days.

(21) Appl. No.: 10/698,092

(22) Filed: Oct. 31, 2003

(65) Prior Publication Data

US 2005/0114450 A1 May 26, 2005

(51) Int. Cl.
*G06F 15/16* (2006.01)
(52) U.S. Cl. ....................... 709/206; 709/217
(58) Field of Classification Search ........ 709/200–207, 709/217–227
See application file for complete search history.

(56) References Cited

U.S. PATENT DOCUMENTS

| 6,839,741 B1* | 1/2005 | Tsai ........................... 709/217 |
| 7,003,551 B2 | 2/2006 | Malik |
| 7,080,099 B2* | 7/2006 | Tada et al. ................ 707/104.1 |
| 2001/0047389 A1* | 11/2001 | Prahlad et al. .............. 709/206 |
| 2002/0120678 A1 | 8/2002 | Jones et al. |
| 2002/0122543 A1* | 9/2002 | Rowen ..................... 379/93.01 |
| 2002/0156853 A1* | 10/2002 | Hyakutake et al. ......... 709/206 |
| 2002/0198944 A1* | 12/2002 | Moss ......................... 709/206 |
| 2003/0041112 A1* | 2/2003 | Tada et al. .................. 709/206 |
| 2003/0135524 A1* | 7/2003 | Cane et al. ................. 707/204 |
| 2004/0034688 A1* | 2/2004 | Dunn ......................... 709/206 |
| 2004/0133645 A1* | 7/2004 | Massanelli et al. ......... 709/206 |
| 2005/0015721 A1* | 1/2005 | Tsai ........................... 715/513 |
| 2005/0050146 A1* | 3/2005 | Jani et al. ................... 709/206 |
| 2005/0060375 A1* | 3/2005 | Ernest et al. ............... 709/206 |

FOREIGN PATENT DOCUMENTS

| WO | 01/06366 | 1/2001 |
| WO | 02/058347 | 7/2002 |
| WO | 02/065316 | 8/2002 |

OTHER PUBLICATIONS

SunOS man pages for "ln" http://docsun.cites.uiuc.edu/sun_docs/C/solaris_9/SUNWaman/hman1/ln.1.html, 2 pages, 1999.
Bolosky, William J., et al., "Single Instance Storage in Windows® 2000," 4th USENIX Windows Systems Symposium Paper 2000, 12 pages.
"NetBackup Storage Migrator™ for Windows® v4.0," "Optimizing Storage in Microsoft® 2000 & Exchange Server Environments," VERITAS Datasheet, version 2, 2002, 2 pages.
"NetBackup Storage Migrator™ for Windows® v4.1," "Automated Data Management for Windows Environments," VERITAS Datasheet, version 2, 2003, 2 pages.
International search report application No. PCT/US2004/035033 mailed Mar. 2, 2005.
Written Opinion application No. PCT/US2004/035033.

* cited by examiner

*Primary Examiner*—Moustafa M. Meky
(74) *Attorney, Agent, or Firm*—Meyertons Hood Kivlin Kowert & Goetzel, P.C.; B. Noël Kivlin (57) ABSTRACT

A system and method for single instance backup. In one embodiment, a method may comprise storing a plurality of duplicate messages on a mail server, where each of the messages includes a copy of an attachment, and storing a copy of each of the plurality of duplicate messages and one or more copies of the attachment to a backup medium, where the number of copies of the attachment stored on the backup medium is less than the number of duplicate messages stored on the backup medium. For example, only a single copy of the attachment may be stored on the backup medium. In one embodiment storing a copy of each of the plurality of duplicate messages and one or more copies of the attachment may comprise extracting metadata from each of the messages, storing the metadata in an attachment index, storing the metadata with each message on the backup medium, and storing the metadata with the copies of the attachment on the backup medium.

21 Claims, 9 Drawing Sheets

| Mail folder 200A | | |
|---|---|---|
| Folder backup time 300A | | 5/17/04 13:50:02 |
| Message 210A | Message time 310A | 5/17/04 13:52:03 |
| Message 210B | Message time 310B | 5/17/04 14:07:36 |
| Message 210C | Message time 310C | 5/16/04 09:41:15 |
| Message 210D | Message time 310D | 5/12/04 21:14:49 |

| Mail folder 200A | | |
|---|---|---|
| Message 210B | Message time 310B | 5/17/04 14:07:36 |
| Attachment 212A | Record number 812A | 56 |
| | | |
| Message 210C | Message time 310C | 5/16/04 09:41:15 |
| Attachment 212B | Record number 812B | 59 |

| Mail folder 200B | | |
|---|---|---|
| Message 210F | Message time 310F | 5/17/04 14:07:36 |
| Attachment 212C | Record number 812C | 56 |

| Mail folder 200C | | |
|---|---|---|
| Message 210J | Message time 310J | 5/17/04 14:07:36 |
| Attachment 212D | Record number 812A | 56 |
| | | |
| Message 210K | Message time 310K | 5/15/04 17:22:57 |
| Attachment 212E | Record number 812E | 61 |

| Attachment index 710 | | | | |
|---|---|---|---|---|
| Message 212A | Message time 5/17/04 14:07:36 | Record number 56 | Mail folder ID 200A, 200B, 200C |
| Message 212B | Message time 5/16/04 09:41:15 | Record number 59 | Mail folder ID 200A |
| Message 212E | Message time 5/15/04 17:22:57 | Record number 61 | Mail folder ID 200C |

SINGLE INSTANCE BACKUP OF EMAIL MESSAGE ATTACHMENTS

BACKGROUND OF THE INVENTION

1. Field of the Invention

This invention relates to the field of computer processing and, more particularly, to the performance of email server backup operations.

2. Description of the Related Art

As computer processing speeds, memory storage, and data bandwidth increase, so does the amount and complexity of data that business and industry manage on a daily basis. For example, modern email messages may be large markup language files which contain image files, audio or video clips, spreadsheets or other large data files as attachments. In addition, the number of users receiving email and the number of messages received daily by each user has skyrocketed.

Email messages may be managed for an office or business by a dedicated server which manages and stores both intra-office and external email. The mail server may provide each user of the email system with one or more folders for storing email messages. As described above, each email message may contain one or more attached files, which may also be stored within the mail folder. Furthermore, because email messages may be sent, or copied, to multiple users at once, a mail server may contain multiple duplicate messages and associated duplicate attachments scattered across multiple folders.

Because email messages may frequently contain information crucial to a business or industry, the contents of mail servers may frequently be copied, or backed up, to a backup storage to prevent loss or corruption of data. However, the large amount of data on many email servers may make this task difficult, since backup operations may be constrained by time and bandwidth limitations. For example, a backup operation may be expected to complete within two hours each night. However, due to the large amount of data to be transferred and the speed at which the data can be transferred, it is possible that not all of the data within the document database can be backed up during the allotted time.

Furthermore, the internal organization of the email server and the interface between the email server and the data backup system may also constrain the backup operation. For example, an email server typically groups messages together by folder or owner. Many data backup systems are configured such that the contents of the entire email server are backed up during each backup session.

SUMMARY OF THE INVENTION

Various embodiments of a system and method for single instance backup are disclosed. In one embodiment, a method may comprise storing a plurality of duplicate messages on a mail server, where each of the messages includes a copy of an attachment, and storing a copy of each of the plurality of duplicate messages and one or more copies of the attachment to a backup medium, where the number of copies of the attachment stored on the backup medium is less than the number of duplicate messages stored on the backup medium. For example, only a single copy of the attachment may be stored on the backup medium. In one embodiment storing a copy of each of the plurality of duplicate messages and one or more copies of the attachment may comprise extracting metadata from each of the messages, storing the metadata in an attachment index, storing the metadata with each message on the backup medium, and storing the metadata with the copies of the attachment on the backup medium.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
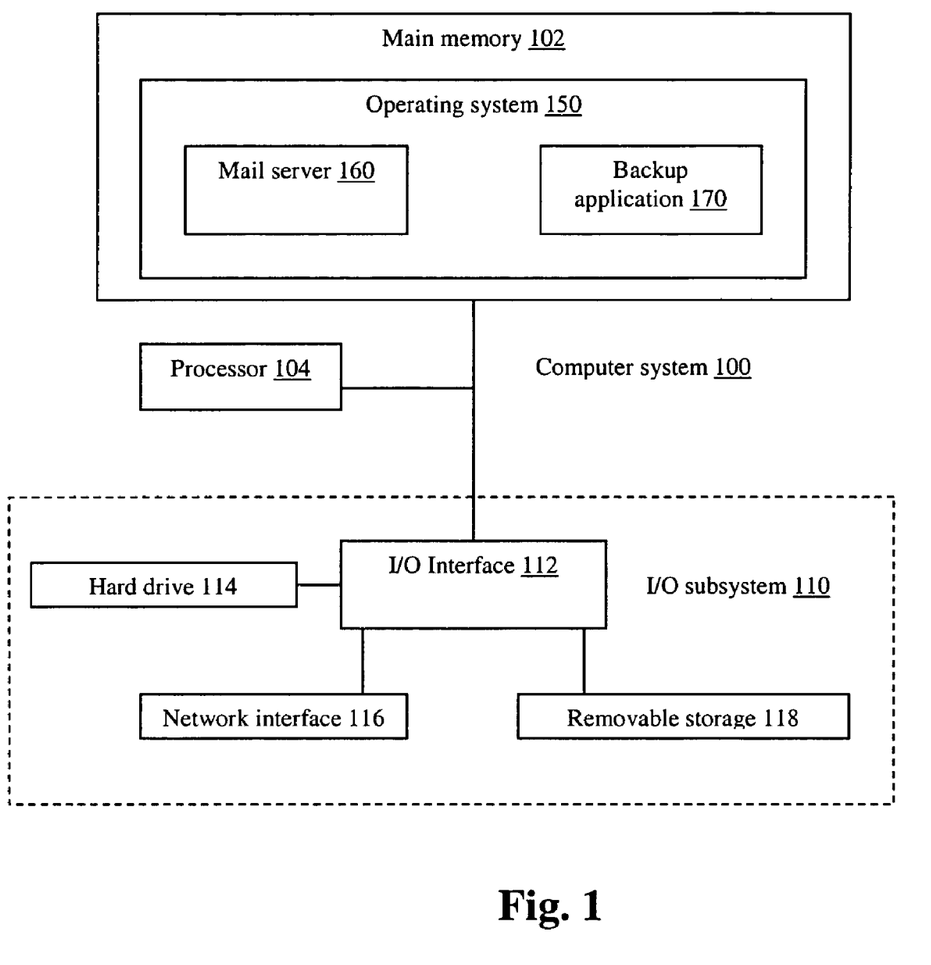
FIG. 1 is a block diagram of one embodiment of a computer system.

Turning now to FIG. 1, a block diagram of one embodiment of a computer system 100 is shown. Computer system 100 includes a processor 104 coupled to a main memory 102. Processor 104 and main memory 102 are in turn connected to an I/O subsystem 110, which comprises an I/O interface 112, a hard disk drive 114, a network interface 116, and a removable storage 118. It is noted that computer system 100 may be representative of a laptop, desktop, server, workstation, terminal, personal digital assistant (PDA) or any other type of computer system.

Processor 104 is representative of any of various types of processors such as an x86 processor, a PowerPC processor or a SPARC processor. Similarly, main memory 102 is representative of any of various types of memory, including DRAM, SRAM, EDO RAM, Rambus RAM, etc.

I/O interface 112 is operational to transfer data between processor 104 and/or main memory 102 and one or more internal or external components such as hard disk drive 114, network interface 116 and removable storage 118, as desired. For example, I/O interface 112 may embody a PCI bridge operable to transfer data from processor 104 and/or main memory 102 to one or more PCI devices. I/O interface 112 may additionally or alternatively provide an interface to devices of other types, such as SCSI devices and/or Fibre channel devices.

Hard disk drive 114 may be a non-volatile memory such as a magnetic media. Network interface 116 may be any type of network adapter, such as Ethernet, fiber optic, or coaxial adapters. Removable storage 118 is representative of a disk drive, optical media drive, tape drive, or other type of storage media, as desired.

In addition to the various depicted hardware components, computer system 100 may additionally include various software components. For example, FIG. 1 illustrates an operating system 150 stored in main memory 102. Operating system 150 is representative of any of a variety of specific operating systems, such as, for example, Microsoft Windows, Linux, or Sun Solaris. As such, operating system 150 may be operable to provide various services to the end user and provide a software framework operable to support the execution of various programs such as mail server 160 and backup application 170. It is noted that the depicted software components of FIG. 1 may be paged in and out of main memory 102 in a conventional manner from a storage medium such as hard drive 114.

Generally speaking, mail server 160 is operable to manage and maintain a plurality of email messages for a plurality of system users. For example, mail server 160 may be operable to send and receive email to and from one or more external sources via the Internet, and to send and receive email between users via an intranet. As will be described below, mail server 160 may be operable to store email messages in one or more folders, each of which may be owned or managed by one or more users. These email messages may be stored in, and copied between, hard drive 114 and main memory 102, in accordance with the execution of mail server 160. In one particular implementation, mail server 160 is embodied by a Microsoft Exchange Server.

Backup application 170 is operable to create a backup copy of email messages from mail server 160 on a backup medium such as removable storage 118 (or any other type of backup storage). Alternatively, selected email messages may be transferred from mail server 160 to a remote backup storage through network interface 116. In various embodiments, backup application 170 may also restore email messages or other data acquired from previous backup operations to mail server 160.

As will be described in further detail below, in one embodiment, backup application 170 may be operable to perform a partial backup of only those messages that were added or modified since a previous backup. For this purpose, backup application 170 may utilize a backup time indicator associated with one or more mail folders in mail server 160. In another embodiment, backup application 170 may be operable to perform a method for backing up only a single instance of an attachment associated with email messages sent to multiple users at the same time.

Figure 2:
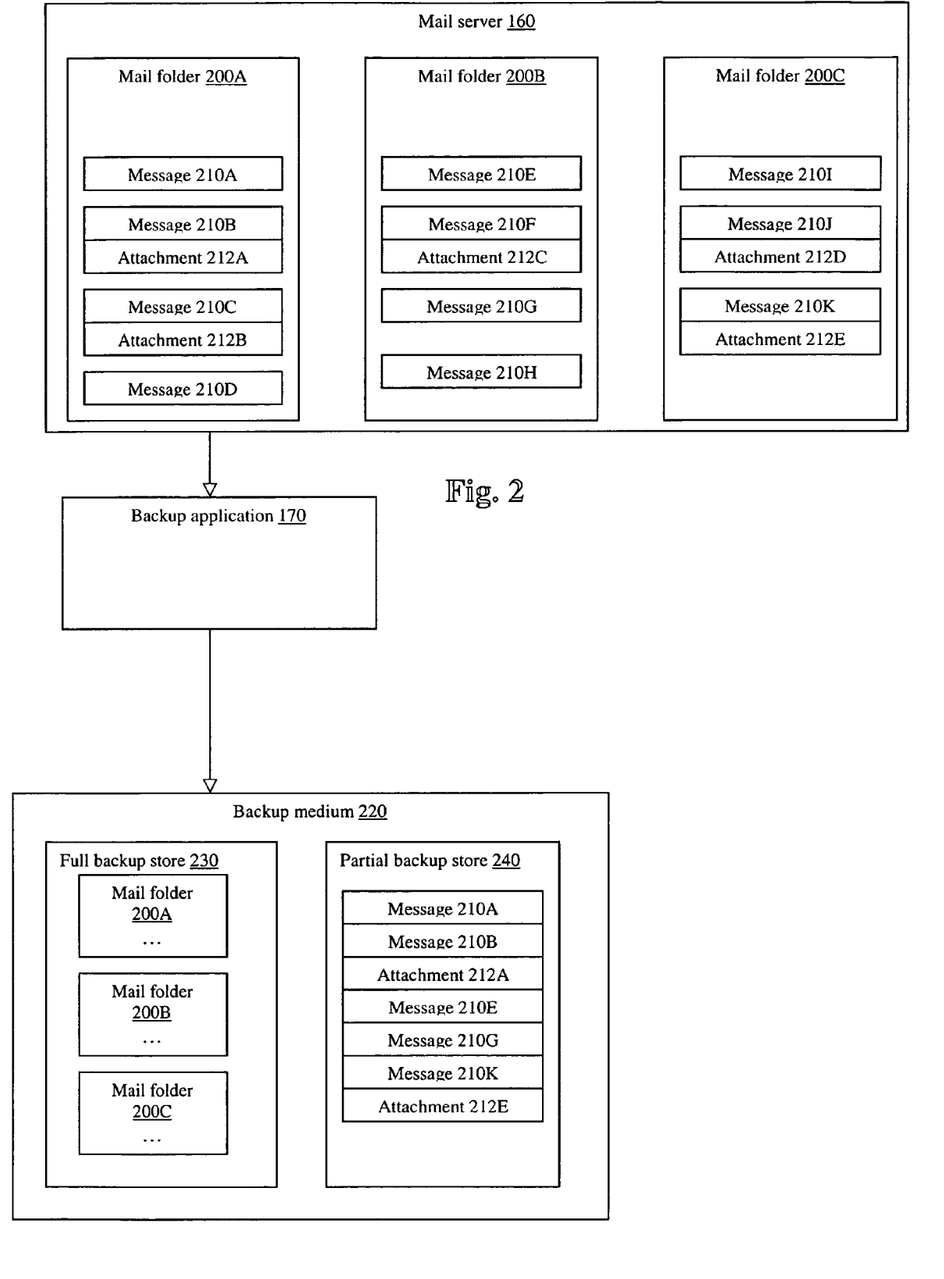
FIG. 2 is a block diagram illustrating aspects associated with one embodiment of a mail server, backup application, and backup medium.

FIG. 2 is a block diagram illustrating aspects associated with one embodiment of mail server 160 and backup application 170. Referring collectively to FIGS. 1-2, in one embodiment mail server 160 may comprise one or more mail folders 200A-200C. Each folder may contain one or more email messages (210A-210K), and each email message 210A-210K may be associated with one or more email attachments (212A-212E). In one embodiment each mail folder 200A-200C may be associated with a specific user of mail server 160, while in another embodiment one or more folders 200A-200C may be owned by or otherwise associated with a single user. It is noted that various elements as described above that are referenced with a particular reference number followed by a letter may be collectively referred to by reference number alone. For example, an email message representative of any of email messages 210A-210K may be referred to simply as email message 210.

It is further noted that in other embodiments mail server 160 may not use mail folders as organizational units, and instead organize email messages 210 and attachments 212 in a database or other type of data structure. In addition, it is noted that the numbers of folders 200, email messages 210 and attachments 212 as illustrated is purely exemplary.

As described above, backup application 170 may be operable to copy one or more messages 210 and attachments 212 to backup medium 220. In various embodiments, backup medium 220 may be a tape drive or other kind of removable storage 118, an external hard drive or other storage device connected to computer system 100 via network adapter 116, a secondary hard drive connected to I/O Interface 112, or any other kind of storage medium used to store backup data.

As will be described in further detail below, in one embodiment, backup application 170 may execute a full backup operation of mail server 160, wherein all data and metadata associated with mail server 160 is backed up to backup medium 220. In one embodiment backup application 170 may execute a full backup by transferring all files comprising mail server 160 to backup medium 220 through the file system of operating system 150. Alternatively, in another embodiment backup application 170 may utilize a specialized backup interface of mail server 160 to backup only the messages 210, attachments 212, and metadata associated with mail server 160. FIG. 2 depicts a full backup 230 including mail folders 200A-200C stored in backup medium 220 as a result of such a full backup operation.

Backup application 170 may additionally perform a partial backup operation. In one embodiment, a partial backup operation may act as a supplement to a previous full backup operation, wherein the partial backup operation backs up all email messages which are new or have been modified since a previous backup operation. As illustrated in FIG. 2, partial backup 240 may comprise a subset of the messages and attachments stored in mail folders 200A-200C. This subset of messages and attachments may correspond to those messages which are new or have been modified since the last backup. It is noted that by transferring only new or modified files or data to backup medium 220, a partial backup may be performed more rapidly than a full backup, thereby advantageously allowing for more efficient use of backup storage and bandwidth.

A plurality of partial backups may be performed subsequent to a full backup to provide a more efficient backup mechanism over an extended period of time. For example, mail server 160 may undergo a full backup every week during a weekend, when the mail server is idle for a relatively long period of time. Following the weekend, mail server 160 may undergo a partial backup at the end of every weekday, thereby backing up any new email messages received each day without the time and bandwidth demands of a full backup. In the event of a system failure, backup application 170 may then restore the data of mail server 160 by restoring full backup followed by one or more partial backups until all backed-up data is restored.

Figure 3:
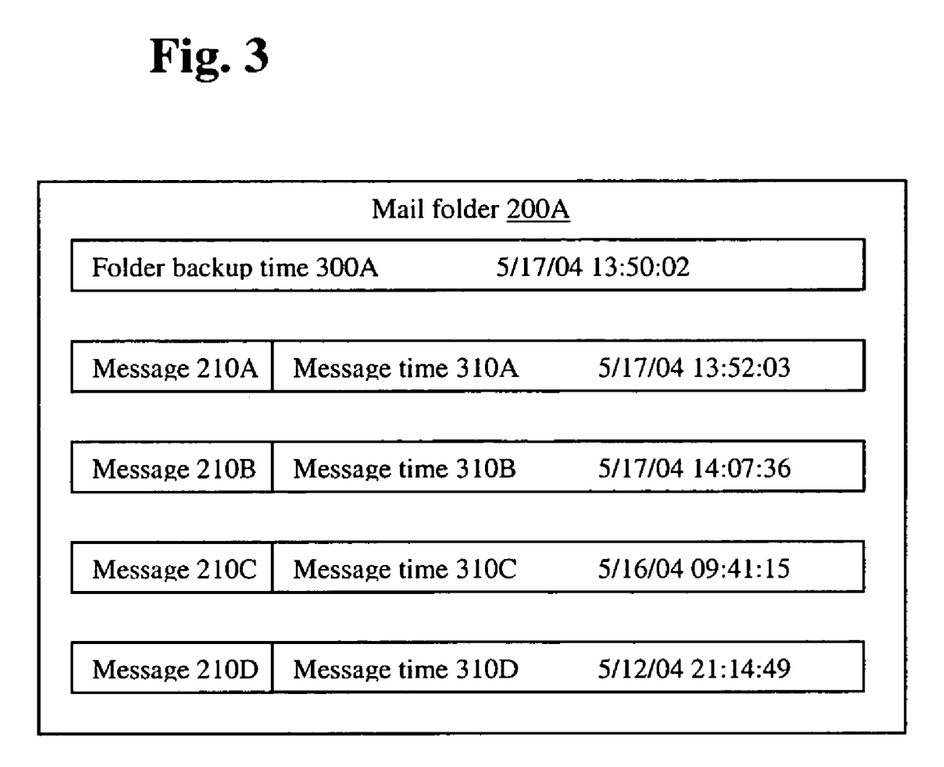
FIG. 3 is a block diagram illustrating one embodiment of a mail folder.

As will be described in further detail below, backup application 170 may determine when a backup has last occurred by utilizing a backup time property associated with the one or more mail folders 200 managed by mail server 160. FIG. 3 is a block diagram illustrating one embodiment of mail folder 200A including a backup time property and email messages 210A-210D. In one embodiment, mail folder 200A may be a defined data object operable to interact with other data objects associated with mail server 170. For example, mail folder 200A may comprise a set of methods or member functions which form an interface to the data contained within mail folder 200A. Mail folder 200A may further comprise a set of properties, or data members, which may be set or modified through the use of member functions. For example, mail folder 200A may contain data members indicating message count, user identification, rules for sorting messages, a linked list containing each email message contained within mail folder 200A, and a folder backup time.

Folder backup time 300A may represent the last time that mail folder 200A underwent a full or partial backup operation. In various embodiments, a folder backup time 300 may comprise a date and a time of day, or may be another representation of a time at which a backup was performed relative to other operations.

It is noted that in one specific implementation, the mail folder property PR_LAST_FULL_BACKUP of Microsoft Exchange is employed to implement folder backup time 300. In other embodiments, a custom property of an Exchange mail folder may be employed to implement folder backup time 300. In other embodiments, several mail folders 200 may be associated with the same backup time 300. Other embodiments may also be possible that maintain a backup time for each individual email message 210 or any group of email messages 210.

Each email message 210 may also be a defined data object with associated member functions and member data. For example, email message 210A may contain data members representing the text of the email message, the sender, the recipient(s), a pointer to one or more attachment files, the date and time the email message was sent and the date and time the email message was received.

Accordingly, each email message 210A-D may be associated with a message time 310A-D which may be used to index the message. As will be described below in further detail, each message time 310 may be compared to folder backup time 300 to determine if the message time 310 is before or after folder backup time 300. The message time may include a date and time of day or may be in any other form that may be compared to folder backup time 300A. In various embodiments, message time 310A-300D may represent the time each message was sent by the sender, the time each message was received by mail server 160, the time the message was last modified, or any other time which may be used to index the message.

As will be described in further detail below, when performing a full or partial backup of mail folder 200, backup application 170 may set folder backup time 300 to indicate that all messages with a message time 310 earlier than the backup time have been backed up to backup medium 220. Accordingly, backup application 170 may advantageously execute a subsequent partial backup operation without having to internally maintain the time mail folder 200 was last backed up.

For example, as illustrated in FIG. 3, message times 310A and 310B of email messages 210A and 210B, respectively, are dated after folder backup time 300A of mail folder 200A. In contrast, message times 310C and 310D of email messages 210C and 210D, respectively, are dated before folder backup time 300A. This thus indicates that email messages 210C and 210D, along any associated attachments 212, have already been backed up in a previous full or partial backup operation.

Figure 4:
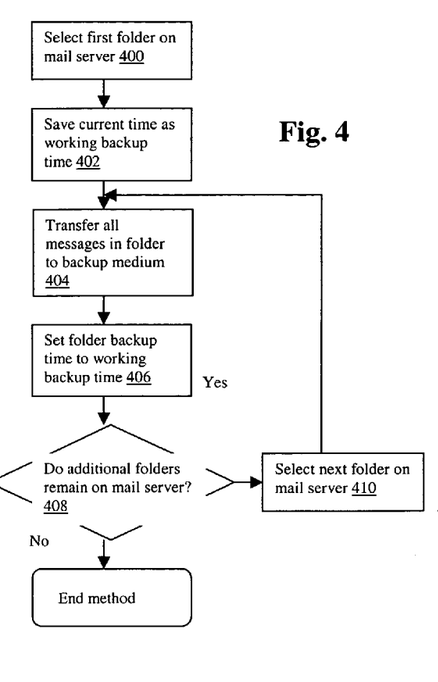
FIG. 4 is a flowchart illustrating one embodiment of a method for full backup of a mail server.

Turning now to FIG. 4, a flowchart illustrating one embodiment of a full backup method is shown. In 400, backup application 170 selects a first mail folder 200 in mail server 160. In various embodiments backup application 170 may select a mail folder 200 alphabetically by owner name, chronologically by folder backup date 300, through a random selection routine, or by any other method which allows all folders to eventually be selected and backed up.

In 402, backup application 170 sets an internal variable referred to herein as working backup time to the current time, e.g., the time the backup operation begins. In one embodiment the working backup time may be a temporary variable stored within backup application 170, while in another embodiment the working backup time may be a data member of mail folder 200.

In 404, backup application 170 transfers all email messages 210 in the selected folder 200 to backup medium 220 via I/O subsystem 110. It is noted that in alternative embodiments, backup application 170 may be operable to prevent any additions or modifications to the selected mail folder 200 while the backup operation occurs.

In 406, backup application sets the folder backup time 300 to the working backup time from step 402. As described above, in one embodiment, folder backup time 300 may be modified directly via a member function associated with the selected mail folder 200 or mail server 170. Alternatively, folder backup time 300 may be embodied as an external file or data structure modified via operating system 150 or a variety of mail server 160 interfaces, depending on the implementation.

In 408 backup application 170 determines if additional message folders 200 remain to be backed up. If no additional message folders remain, the method may end. Alternatively, if additional message folders do remain, backup application 170 may advance to step 410, wherein another message folder is selected. Backup application 170 may then repeat steps 404-410 for the remaining folders.

Figure 5:
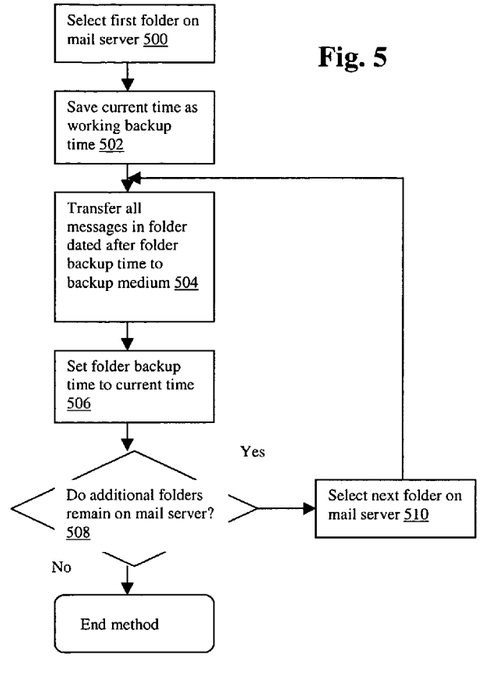
FIG. 5 is a flowchart illustrating one embodiment of a method for differential backup of a mail server.

Turning next to FIG. 5, a flowchart illustrating one embodiment of a partial backup method is shown. Specifically, FIG. 5 illustrates one embodiment referred to herein as an incremental backup, wherein all messages 210 since the last backup are copied to a backup medium 220 and the folder backup time 300 is modified to indicate that another backup has occurred. In an alternative embodiment described below in conjunction with FIG. 6, a differential backup operation may be performed in which folder backup time 300 is not updated.

In 500, backup application 170 selects a first mail folder 200 in mail server 160. In various embodiments backup application 170 may select a folder alphabetically by owner name, chronologically by folder backup date 300, through a random selection routine, or by any other method which allows all folders to eventually be selected and backed up.

In 502, backup application 170 saves the current time, e.g., the time the incremental backup operation begins, as a data variable, referred to herein as the working backup time. In one embodiment the working backup time may be a temporary variable stored within backup application 170, while in another embodiment the working backup time may be a data member of mail folder 200.

In 504, backup application 170 copies all email messages 210 in the selected folder 200 which have a message time 310 dated after folder backup time 300 to backup medium 220. In one embodiment backup application 170 may perform step 504 by sorting through each email message 210 in folder 200 and comparing folder backup time 300 to message time 310. Alternatively, mail folder 160 may offer a member function to filter only those messages 210 which have a message time 310 after folder backup time 300. Backup application 170 may then write the selected email messages 210 to backup medium 220. It is noted that in some alternative embodiments, backup application 170 may be operable to prevent any additions or modifications to the selected mail folder 200 while the backup operation occurs.

In 506, backup application 170 sets folder backup time 300 to working backup time of step 502. As described above, in one embodiment, folder backup time 300 may be modified directly via a member function associated with the selected mail folder 200 or mail server 170. Alternatively, folder backup time 300 may be embodied as an external file or data structure modified via operating system 150 or a variety of mail server 160 interfaces, depending on the implementation.

In 508 backup application 170 determines if additional messages folders 200 remain to be backed up. If no additional message folders 200 remain, the method may end. Alternatively, if additional message folders 200 do remain, backup application 170 may advance to step 510, wherein another message folder is selected according to the folder selection mechanism used in step 500. Backup application 170 may then repeat steps 504-510.

Figure 6:
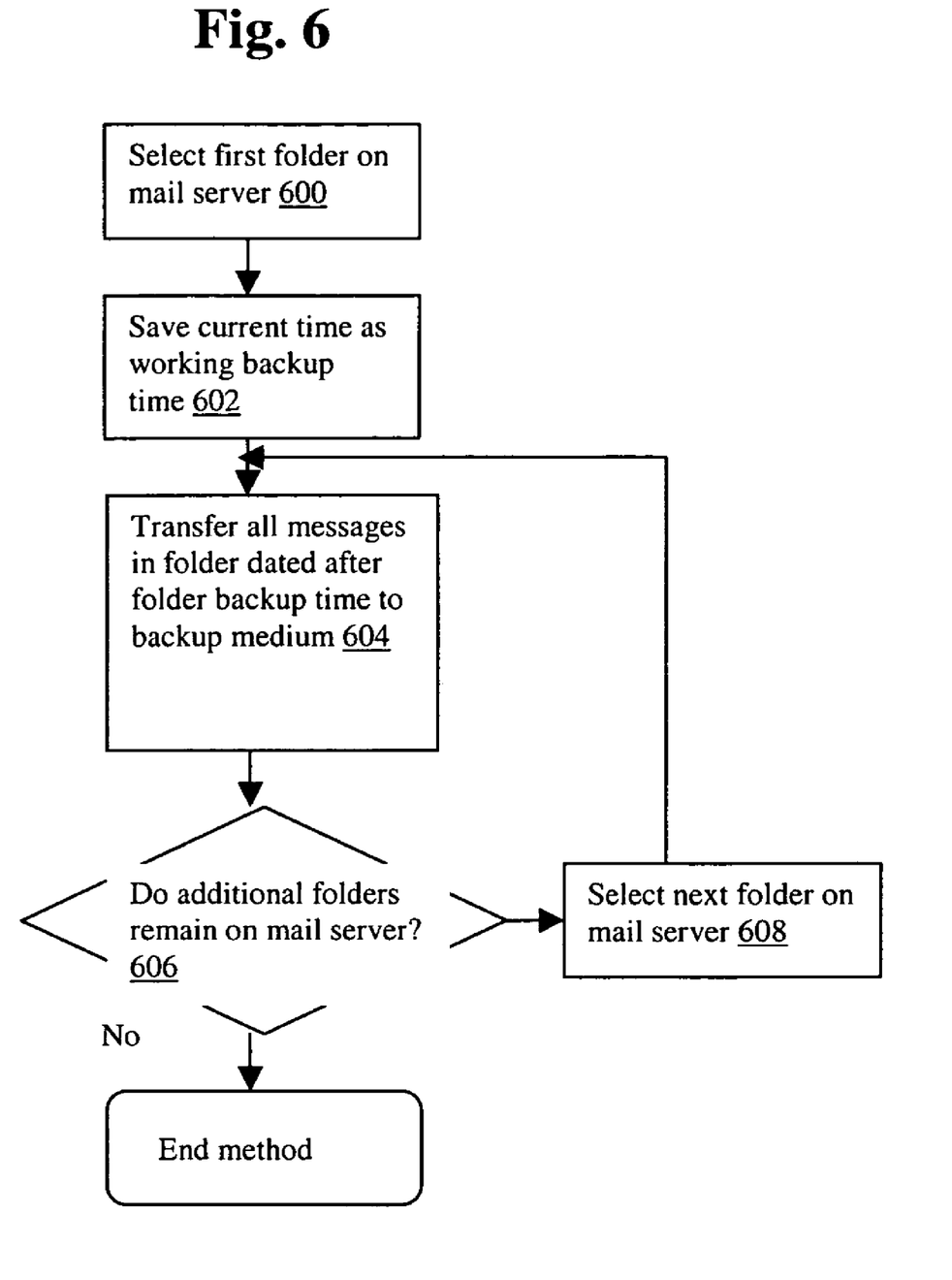
FIG. 6 is a flowchart illustrating one embodiment of a method for incremental backup of a mail server.

FIG. 6 illustrates one embodiment of a differential backup, wherein all messages since the last backup are copied to a backup medium 220 and the folder backup time 300 is unmodified. In 600, backup application 170 selects a first mail folder 200 in mail server 160. In 602, backup application 170 saves the current time, e.g., the time the differential backup operation begins, as a data variable referred to herein as the working backup time. In one embodiment the working backup time may be a temporary variable stored within backup application 170, while in another embodiment the working backup time may be a data member of mail folder 200.

In 604, backup application 170 transfers all email messages 210 in the selected folder 200 which have a message time 310 dated after folder backup time to backup medium 220. In one embodiment backup application 170 may perform step 604 by sorting through each email message 210 in folder 200 and comparing folder backup time 300 to message time 310. Alternatively, mail folder 160 may offer a member function to filter only those messages 210 which have a message time 310 after folder backup time 300. Backup application may then write the selected email messages 210 to backup medium 220. It is noted that in some alternative embodiments, backup application 170 may be operable to prevent any additions or modifications to the selected mail folder 200 while the backup operation occurs.

In 606 backup application 170 determines if additional message folders 200 remain to be backed up. If no additional message folders 200 remain, the method may end. Alternatively, if additional message folders 200 do remain, backup application 170 may advance to step 608, wherein another message folder 200 is selected according to the folder selection mechanism used in step 600. Backup application 170 may then repeat steps 604-608.

Other embodiments of the full and partial backup methods described in FIGS. 4-6 are possible. For example, backup application may select and backup email messages 210 on an individual basis, or may sort through email messages 210 grouped by owner, message time 310, or any other grouping method. In addition, as described above, backup application 170 may utilize various data members and other properties to determine if a message has previously been backed up.

Figure 7:
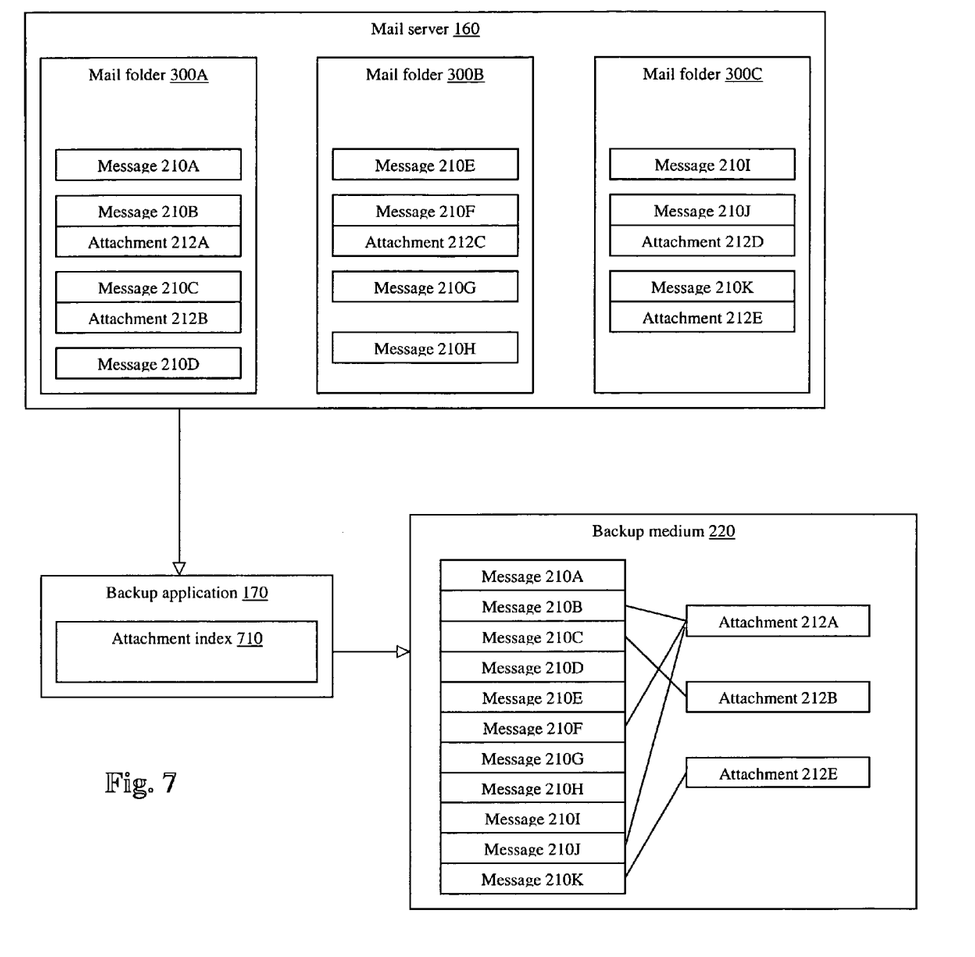
FIG. 7 is a block diagram illustrating aspects of another embodiment of a mail server, backup application, and backup medium.

Turning next to FIG. 7, a block diagram illustrating aspects of a further embodiment of mail server 160 and backup application 170 is shown. In the embodiment of FIG. 7, backup application is configured to backup a single instance of an attachment associated with multiple email messages. By minimizing the number of duplicate attachments 212 saved to backup medium 220, backup application 170 may advantageously reduce the amount of data transferred to and stored on backup medium 220, thereby allowing for more efficient use of backup resources such as bandwidth.

One or more of messages 210 and attachments 212 may be duplicate copies of the same message 210 and/or attachments 212. For example, in one embodiment an email message 210 may have been sent to three different users of mail server 160. Accordingly, email messages 210B, 210F, and 210J may be copies of the same email message, and attachments 212A, 212C, and 212D may be copies of the same attachment, each stored in a separate folder 200A-200C owned by a different user of mail server 160. Alternatively, message 210B and attachment 212A may be a single message and attachment sent to a single user, while messages 210F and 210J and attachments 212C and 212D may be identical copies of the message and attachment made by the single user and kept in separate folders for organizational purposes.

As will be described in further detail below, backup application 170 may be operable to copy each message 210 to backup medium 220 and detect one or more attachments 212 associated with each message 210. Backup application 170 may then be operable to store metadata associated with each attachment 212 in an attachment index 710, and to use the metadata to store only one copy of each unique attachment 212 in backup medium 220.

Figure 8:
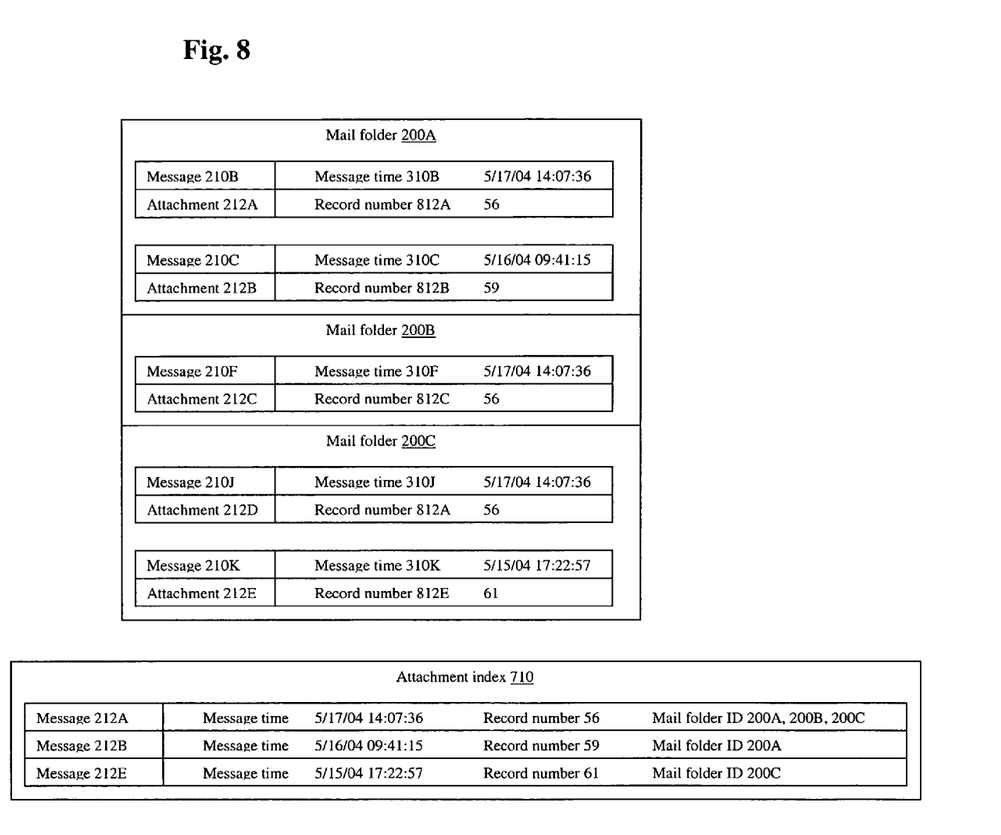
FIG. 8 is a block diagram illustrating one embodiment of a mail folder and attachment index.

FIG. 8 is a block diagram illustrating one embodiment of mail folders 200A-C and attachment index 710. For the sake of simplicity, only those email messages 210 with attachments 212 are illustrated. As shown in FIG. 8, each email message 210 which contains an attachment 212 may be associated with one or more pieces of metadata, such as message time 310 and attachment record number 812A-812E. Each email message 210 and attachment 212 may be embodied as a data object with one or more data members, each of which may include one or more pieces of metadata. For example, in one embodiment mail server 160 may be a Microsoft Exchange server, and message time 310 and record number 812 may correspond to the PR_MODIFIED_DATE and PR_RECORD_KEY properties of attachment 212.

In the depicted embodiment, each email message 210 which contains an attachment 212 may also contain a data member indicating a corresponding record number 812, thereby associating each email message 210 with one or more attachments 212. It is noted that in various embodiments, each email message 210 and attachment 212 may contain additional or alternative metadata which may provide a unique identifier for each attachment, including, but not limited to, a message ID, a folder ID, or the owner of the attachment 212.

As described above, attachment index 710 may be operable to store metadata associated with each attachment 212. Specifically, as will be described in further detail below, backup application 170 may be operable to record metadata associated with each attachment 212 in attachment index 710 while storing one or more email messages 210 in backup medium 220. Because duplicate copies of an attachment 212 will have similar metadata, attachment index 710 may be operable to limit entries to one per unique attachment 212. As shown in FIG. 8, attachment metadata may include the message time 310 of the email messages 210 associated with each attachment 212, the record numbers 812 which link email messages 210 to attachments 212, and the mail folders 200 each attachment 212 is associated with.

In one embodiment attachment index 710 may be a data structure operable to store and sort each entry by one or more metadata fields. Alternatively, attachment index 710 may be a text file, linked list, or other data structure operable to store metadata, as described above. It is further noted that in one embodiment, attachment index 710 may maintain a separate entry for each individual attachment 212, rather than grouping each duplicate attachment under the same entry.

Figure 9:
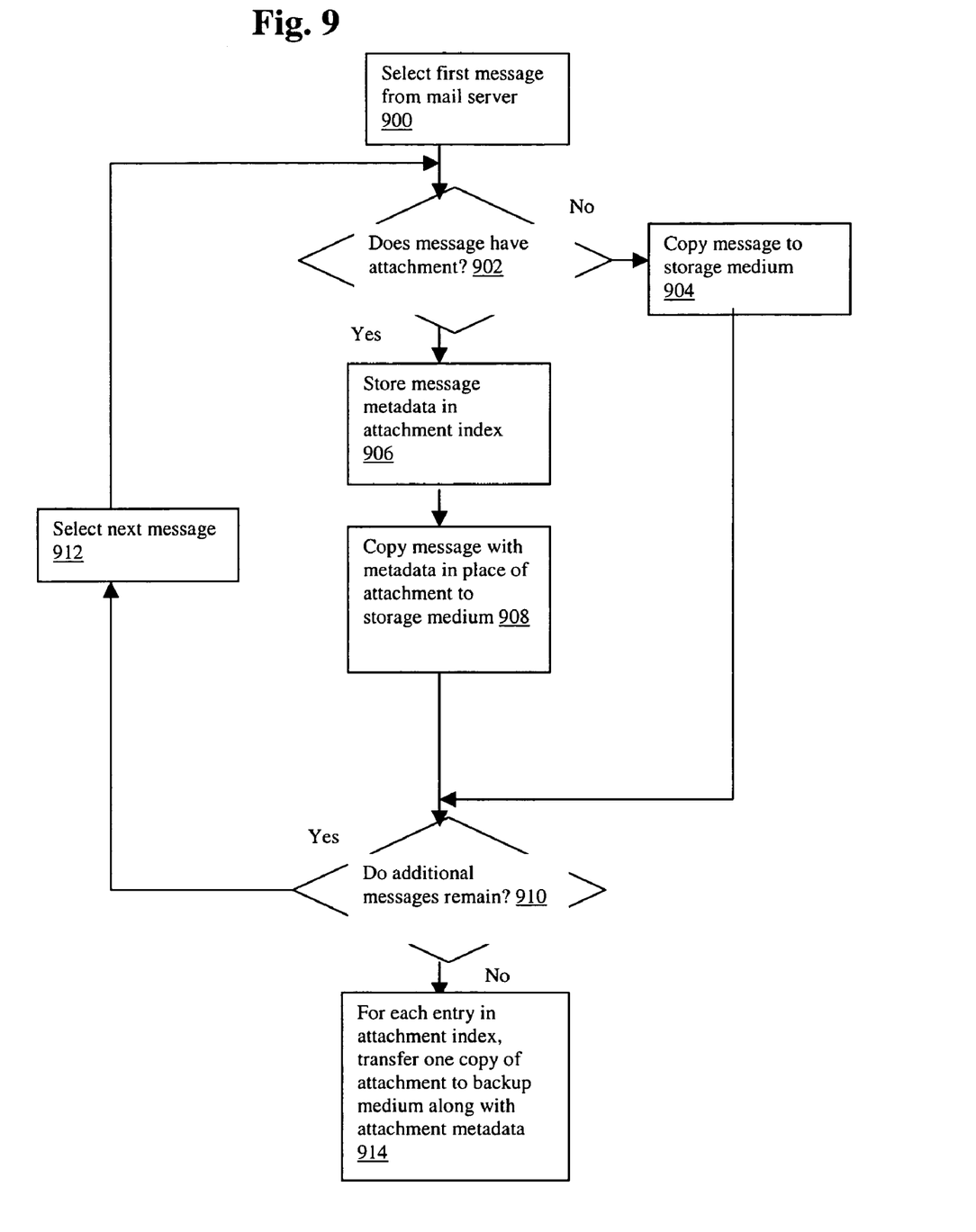
FIG. 9 is a flowchart illustrating one embodiment of a method for single instance backup of email message attachments.

FIG. 9 is a flowchart illustrating one embodiment of a method for saving a single instance of an attachment from a set of duplicate attachments on a mail server 160. In 900, backup application 170 selects a first mail message 210 from mail server 160. In various embodiments backup application 170 may select an email message 210 alphabetically by user name, chronologically by folder backup date, through a random selection routine, or by any other method which allows all messages to eventually be selected.

In 902, backup application 170 determines if the selected message 210 contains an attachment file 212. As described above, each email message 210 may be a data object with one or more data members, including a record number 812. Alternatively, each email message 210 may contain a data member indicating if or how many attachments 212 are attached to the message 210. Accordingly, backup application 170 may be operable to examine the relevant data members of the selected message 210 and determine if the selected message 210 contains an attachment file 212.

If, in 902, it is determined that the selected message 210 contains no attachment 212, backup application 170 may advance to 904, wherein the selected message is copied to backup medium 220 as described above. Backup application 170 may then advance to step 910.

Alternatively, if it is determined in step 902 that the selected message 210 does contain an attachment 212, backup application 170 may advance to step 906, wherein backup application 170 may store the metadata associated with the selected message 210 and attachment 212 in attachment index 710. For example, in one embodiment backup application 170 may read metadata such as message time 312, record number 812, and a mail folder ID, and store the metadata as a single entry in attachment index 710.

In 908, backup application 170 copies the selected message 210 and the associated metadata to backup medium 220 without the associated attachment 212. As will be described in further detail below, the stored metadata may later be used to restore a single instance of the associated attachment 212 to mail server 160. It is noted that in one embodiment, a selected message 210 may comprise a data structure separate from associated attachment 212. The selected message 210 may further contain all necessary metadata, such as message time 310, record number 812, and the associated mail folder ID. In such an embodiment, backup application 170 may be able to execute step 908 simply by copying the selected message 210 to backup medium 220, without any further operations.

Alternatively, in various embodiments attachment 212 and message 210 may be part of the same data structure, and/or message 210 may not store the required metadata, as described above. Backup application 170 may thus utilize one or more member functions associated with mail server 160 to separate selected message 210 from attachment 212. Furthermore, backup application 170 may store the associated metadata with a copy of selected message 212 on backup medium 220 as a separate data structure.

In 910 backup application 170 determines if additional messages 210 remain to be backed up from mail server 160. If additional messages 210 do remain, backup application 170 may advance to step 912, wherein the next email message 210 on mail server 160 is selected and steps 902-910 are repeated. Alternatively, if no messages 160 remain, backup application 170 may advance to step 914.

In step 914, backup application 170 may access each individual entry in attachment index 710, each of which may correspond to a single unique attachment 212 on mail server 160. Backup application 170 may then transfer a single copy of each unique attachment 212 to backup medium 220, along with the metadata associated with the attachment 212. For example, in one embodiment backup application 170 may store each backup copy of an attachment 212 under a file name derived from the metadata associated with the attachment 212. Alternatively, backup application 170 may store the metadata associated with each backup attachment copy 212 in a data structure associated with the backup copy of the attachment 212 on backup medium 220.

It is noted that by storing both the backup message copies 210 and the backup attachment copies 212 with unique and matching metadata, backup application 170 may cause the messages 210 and attachments 212 to later be rejoined and restored on mail server 160, as will be described in further detail below. In addition, as described above, by storing only a single instance of each unique attachment 212 on backup medium 220, the total amount of data stored on backup medium 220 may be reduced, thus allowing for more efficient backup functionality.

Figure 10:
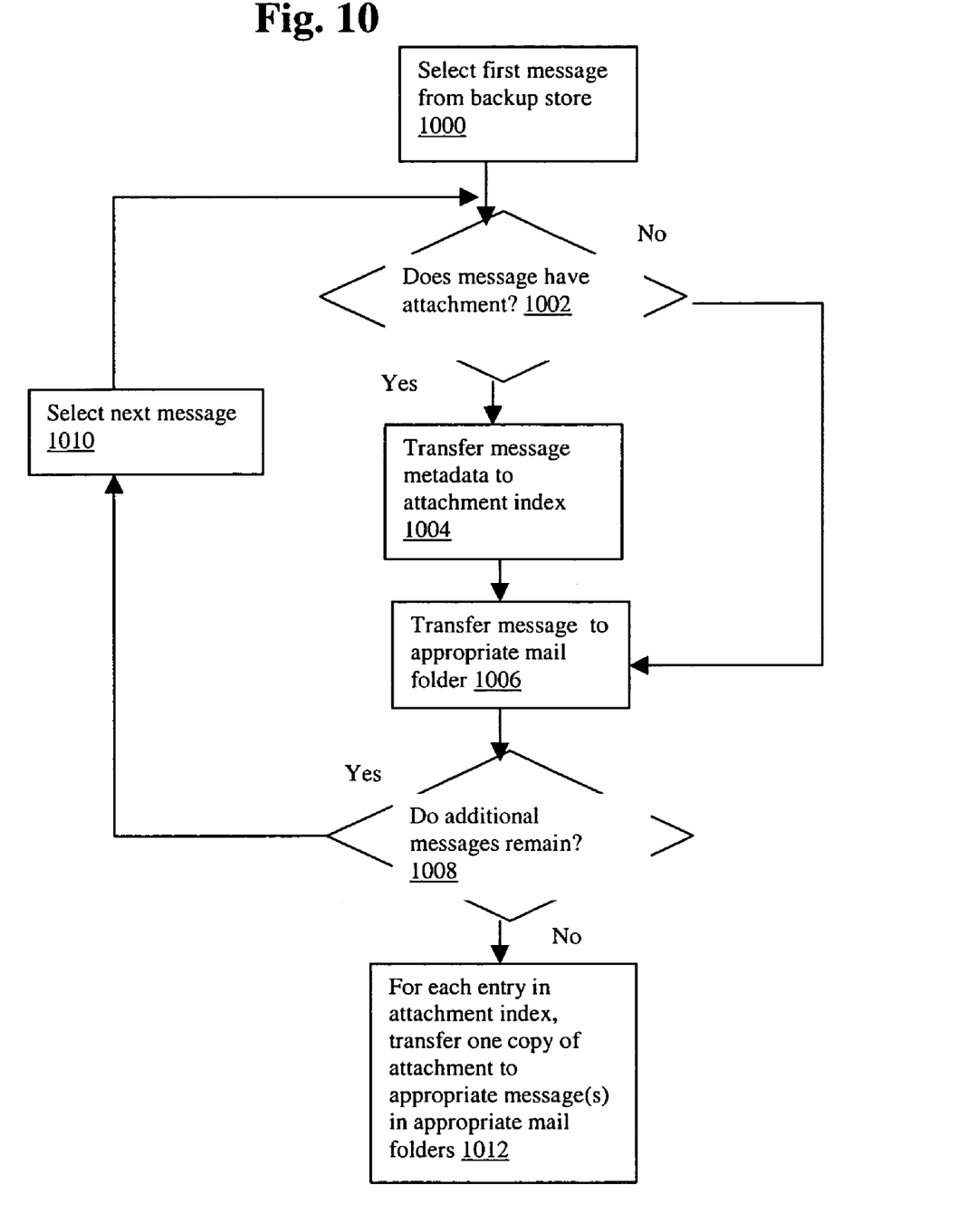
FIG. 10 is a flowchart illustrating one embodiment of a method for restoration of a mail server.

FIG. 10 illustrates a method for restoring the messages 210 and attachments 212 stored on backup medium 220 to mail server 160. In 1000, backup application 170 selects a first mail message 210 from backup medium 220. In various embodiments backup application 170 may select a message alphabetically by user name, chronologically by folder backup date, through a random selection routine, or by any other method which allows all messages to eventually be selected.

In 1002, backup application 170 determines if the selected message 210 was previously associated with an attachment 212. As described above, each email message 210 may be a data object with one or more data members, including a record number 812. Alternatively, each email message 210 may contain a data member indicating if or how many attachments 212 were attached to the message 212. Accordingly, backup application 170 may be operable to examine the relevant data members of the selected message 210 and determine if the selected message 212 previously contained an attachment 212.

If, in 1002, it is determined that the selected message 212 contains no attachment 212, backup application 170 may advance to 1006, wherein the selected message 210 is restored to the correct location in mail server 160. In one embodiment backup application 170 may utilize a programmatic interface with mail server 160 to restore the message 212, while in another embodiment, backup application 170 may be operable to directly copy the message 212 directly to the appropriate file location in operating system 150 from backup medium 220.

Alternatively, if it is determined in step 1002 that the selected message 210 did previously contain an attachment file, backup application may advance to step 1004, wherein backup application 170 may store the metadata associated with the selected message 210 in attachment index 710 as described above. It is noted that in one embodiment backup application 170 may create a single entry in attachment index 710 for each unique instance of an attachment 212, as indicated by similar metadata retrieved from various messages 210. Alternatively, backup application 170 may create an entry in attachment index 710 for each message in backup medium 220 which previously contained an attachment 212. Backup application 170 may then advance to step 1006, as described above.

In 1008 backup application 170 determines if additional messages 210 remain to be restored from backup medium 220. If additional messages 210 do remain, backup application 170 may advance to step 1010, wherein the next message 210 on backup medium 220 is selected, and steps 1002-1008 repeat. Alternatively, if no messages remain, backup application 170 may advance to step 1012.

In step 1012, backup application 170 may access each individual entry in attachment store 710, each of which may correspond to a single unique attachment 212 in backup medium 220. Backup application 170 may then restore a single copy of each unique attachment 212 to the correct message 210 in mail server 810. For example, in one embodiment backup application 170 may access the metadata associated with each attachment 212 as a file name, as described above. Alternatively, backup application 170 may access the metadata associated with each attachment 212 as a separate data structure on backup medium 220.

Backup application 170 may then search or index through attachment index 710 to determine which messages 210 in which folders 200 previously contained a copy of the selected attachment 212. For example, in the embodiment illustrated in FIG. 8, message time 312, record number 812 and the IDs of one or more mail folders 200 may be used to uniquely identify each message 210 which was stripped of the selected attachment 212 in step 908 of FIG. 9. Backup application may then restore a copy of the attachment 212 to each message 210 through the various mechanisms described in step 1006. Once each attachment 212 has been restored to each associated message 210, the method may end.

It is noted that in some embodiments an email server may be configured to perform the incremental and/or differential partial backup functionality discussed above in FIGS. 2-6, as well as the single instance backup functionality for attachments as discussed with reference to FIGS. 7-10. Other embodiments may be configured to perform only portions of this functionality.

It is further noted that any of the embodiments described above may further include receiving, sending or storing instructions and/or data that implement the operations described above in conjunction with FIGS. 1-10 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for backing up a plurality of e-mail messages, wherein at least two of said plurality of e-mail messages include the same attachments, said method comprising:
   backing up said plurality of e-mail messages to a storage medium along with only one instance of any duplicate attachments, wherein said backing up includes, for each of said plurality of e-mail messages:
   if a current one of the plurality of e-mail messages includes an attachment:
   extracting metadata from the current e-mail message;
   buffering the extracted metadata in a corresponding entry in a data structure; and
   storing the current e-mail message and the extracted metadata on the storage medium without the attachment;
   otherwise:
   storing the current e-mail message to the storage medium; and
   wherein a given entry in said data structure corresponds to a given attachment, and wherein said given entry includes metadata corresponding to one or more of said plurality of e-mail messages that include said given attachment.

2. The method of claim 1, including:
   after said backing up said plurality of e-mail messages to the storage medium, for each entry in said data structure, subsequently storing, to the storage medium, only one instance of the attachment corresponding with the entry, along with corresponding metadata.

3. The method of claim 2 wherein each stored instance of an attachment is stored under a file name based on the metadata.

4. The method of claim 1 wherein the metadata includes a mail folder ID.

5. The method of claim 1 wherein the metadata includes a message time.

6. The method of claim 1 wherein the metadata includes a record number.

7. The method of claim 1 wherein the metadata includes a mail recipient.

8. The method of claim 1, wherein one or more entries in the data structure refer to the same attachment.

9. A method for restoring a plurality of e-mail messages, comprising:
   restoring a plurality of e-mail messages from a storage medium, including, for each of the plurality of e-mail messages:
   if a current e-mail message includes an attachment:
   reading the metadata stored with the current e-mail message;
   buffering the metadata in a corresponding entry in a data structure; and
   restoring the current e-mail message from the storage medium, without restoring the attachment; and
   otherwise:
   restoring the current e-mail message from the storage medium;
   wherein a given entry in said data structure corresponds to a given attachment, and wherein said given entry includes metadata corresponding to one or more of said plurality of e-mail messages that include said given attachment.

10. The method of claim 9 further including:
after said restoring the plurality of e-mail messages from the storage medium, for each entry in the data structure, subsequently restoring one copy of the attachment for each of the plurality of e-mail messages having metadata included in the entry.

11. A method for backing up a plurality of e-mail messages, wherein at least two of said plurality of e-mail messages include the same attachments, said method comprising:
storing each of said plurality of e-mail messages to a sequential backup medium without any attachments;
after storing said plurality of e-mail messages, subsequently storing, to said sequential backup medium, only one instance of any attachments to said plurality of e-mail messages, wherein said storing of said attachments includes storing, for a given attachment, metadata indicative of any of said plurality of e-mail messages that include said given attachment.

12. A computer readable memory medium including program instructions for backing up a plurality of e-mail messages, wherein at least two of said plurality of e-mail messages include the same attachments, wherein the program instructions are executable to:
back up each of said plurality of e-mail messages to a storage medium along with only one instance of any duplicate attachments, wherein said backing up includes, for each of said plurality of e-mail messages, program instructions executable to:
if a current one of the plurality of e-mail messages includes an attachment:
extract metadata from the current e-mail message;
buffer the extracted metadata in a corresponding entry in a data structure; and
store the current e-mail message and the extracted metadata on the storage medium without the attachment;
otherwise:
store the current e-mail message to the storage medium; and
wherein a given entry in said data structure corresponds to a given attachment, and wherein said given entry includes metadata corresponding to one or more of said plurality of e-mail messages that include said given attachment.

13. The memory medium of claim 12, further including program instructions executable to:
after said backing up said plurality of e-mail messages to the storage medium, for each entry in said data structure, subsequently store, to the storage medium, only one instance of the attachment corresponding with the entry, including storing corresponding metadata.

14. The memory medium of claim 13 wherein each stored instance of an attachment is stored under a file name based on the metadata.

15. The memory medium of claim 12 wherein the metadata includes a mail folder ID.

16. The memory medium of claim 12 wherein the metadata includes a message time.

17. The memory medium of claim 12 wherein the metadata includes a record number.

18. The memory medium of claim 12 wherein the metadata includes a mail recipient.

19. The memory medium of claim 12, wherein one or more entries in the data structure refer to the same attachment.

20. The memory medium of claim 12 further including program instructions executable to:
restore a plurality of e-mail messages from a storage medium, including, for each of the plurality of e-mail messages, program instructions executable to:
if a current e-mail message includes an attachment:
read the metadata stored with the current e-mail message;
buffer the metadata in a corresponding entry in a data structure; and
restore the current e-mail message from the storage medium, without restoring the attachment; and
otherwise:
restore the current e-mail message from the storage medium;
wherein a given entry in said data structure corresponds to a given attachment, and wherein said given entry includes metadata corresponding to one or more of said plurality of e-mail messages that include said given attachment.

21. The memory medium of claim 20 further including program instructions executable to:
after said restoring the plurality of e-mail messages from the storage medium, for each entry in the data structure, subsequently restore one copy of the attachment for each of the plurality of e-mail messages having metadata included in the entry.

* * * * *